United States Patent [19]

Asai et al.

[11] Patent Number: 4,911,997

[45] Date of Patent: * Mar. 27, 1990

[54] MAGNETIC RECORDING MEDIUM

[75] Inventors: Takamitsu Asai; Masaaki Fujiyama, both of Odawara, Japan

[73] Assignee: Fuji Photo Film Co., Ltd., Minami-Ashigara, Japan

[ * ] Notice: The portion of the term of this patent subsequent to Apr. 14, 2004 has been disclaimed.

[21] Appl. No.: 80,178

[22] Filed: Jul. 31, 1987

Related U.S. Application Data

[63] Continuation of Ser. No. 723,102, Apr. 15, 1985, abandoned.

[30] Foreign Application Priority Data

Apr. 23, 1984 [JP] Japan ................................. 59-80052

[51] Int. Cl.$^4$ .............................................. G11B 5/66
[52] U.S. Cl. .................................... 428/329; 428/328; 428/694
[58] Field of Search .......................................... 428/329

[56] References Cited

U.S. PATENT DOCUMENTS

| | | | |
|---|---|---|---|
| 4,396,668 | 8/1983 | Saito et al. | 428/220 |
| 4,442,159 | 4/1984 | Dezawa et al. | 428/328 |
| 4,486,496 | 12/1984 | Dezawa et al. | 428/900 |
| 4,511,617 | 4/1985 | Hideyama et al. | 428/212 |
| 4,552,808 | 11/1985 | Fujiyama et al. | 428/328 |
| 4,565,726 | 1/1986 | Oguchi et al. | 428/328 |
| 4,624,883 | 11/1986 | Yamaguchi et al. | 428/328 |
| 4,624,894 | 11/1986 | Kishimoto | 428/328 |
| 4,657,813 | 4/1987 | Asai et al. | 428/328 |

FOREIGN PATENT DOCUMENTS 2225 1/1983 Japan .

Primary Examiner—Marion C. McCamish
Assistant Examiner—Dennis V. Carmen
Attorney, Agent, or Firm—Armstrong, Nikaido, Marmelstein, Kubovcik & Murray

[57] ABSTRACT

A magnetic recording medium whose output is increased over a wide range of from long wavelengths to short wavelengths and whose output fluctuation with rotation period is decreased when rotating and reproducing in the form of a disk is provided comprising a non-magnetic support and a magnetic layer provided thereon containing a ferromagnetic substance, the magnetic layer having a multilayer structure consisting of a lower layer containing a ferromagnetic substance in an ellipsoidal shape with $$1.5 \leq \frac{\text{long axis}}{\text{short axis}} \leq 10$$

and a saturation magnetization of at least 60 emu/g and an upper layer containing a ferromagnetic substance of plate-shaped hexagonal system having the axis of easy magnetization in the vertical direction to the plate surface.

11 Claims, 1 Drawing Sheet

MAGNETIC RECORDING MEDIUM

This application is a continuation of application Ser. No. 723,102 filed Apr. 15, 1985 now abandoned.

BACKGROUND OF THE INVENTION

1. Field of the Invention

This invention relates to a magnetic recording medium and more particularly, it is concerned with a magnetic recording medium in which the output is increased over a wide wavelength region from long wavelengths to short wavelengths and in the case of subjecting the magnetic recording medium in the form of a disk to rotation and reproduction, in particular, the width of output fluctuation with its rotation period is reduced.

2. Description of the Prior Art

Up to the present time, magnetic recording media have widely been used for magnetic recording and reproducing, which are obtained by dispersing a ferromagnetic substance consisting of acicular crystals of $\gamma$-$Fe_2O_3$ or $CrO_2$ in a binder and coating the resulting coating composition onto a non-magnetic support. Lately, however, improvement of the recording density has eagerly been desired so as to achieve the enlargement of a recording capacity and the miniaturization, but it is necessary to make the maximum size of an acicular magnetic grain sufficiently smaller than a recording wavelength or recording bit length in order to obtain a recording medium suitable for high density recording using an acicular magnetic powder as in the prior art. At the present time, an acicular magnetic powder with a size of about 0.3 $\mu$m has been put to practical use to obtain a shortest recording wavelength of about 1 $\mu$m.

For the purpose of obtaining a medium whereby a further high density recording is made possible in future, it will be required to make further small the size of an acicular magnetic powder. In such a small acicular magnetic powder, however, the thickness is extremely fine, e.g. 100 Å or less and the grain volume is very small, e.g. $10^{-17}$ $cm^3$ or less, which result in the problem that the magnetic properties are deteriorated by thermal agitation or surface effects and a sufficient orientation cannot be obtained even if a magnetic field is applied to the magnetic coating film.

In a magnetic recording medium coated with a coating composition in which an acicular magnetic substance having an acicular ratio (long axis/short axis) of more than 10 is dispersed, the direction of coating due to the acicular shape remains so that in the case of using the magnetic recording medium by rotating in the form of a disk, an output fluctuation with its rotation period occurs.

Accordingly, there have hitherto been proposed magnetic recording media each using, as a ferromagnetic substance, hexagonal ferrite which is plate-shaped and has the axis of easy magnetization in the vertical direction to the plate surface, and each being subjected to magnetic orientation in the longitudinal direction in the plane of the recording medium (Japanese Patent Application OPI (Kokai) Nos. 6525/1983 and 6526/1983). However, thee magnetic recording media using hexagonal ferrites have the drawback that the output is high at high frequency side but is low at low frequency side.

SUMMARY OF THE INVENTION

It is an object of the present invention to provide a new magnetic recording medium whereby the above described drawbacks of the prior art can be overcome.

It is another object of the present invention to provide a magnetic recording medium whose output is improved over a wide wavelength range of from long wavelengths to short wavelengths.

It is a further object of the present invention to provide a magnetic recording medium in the form of a disk to be rotated, whereby the output fluctuation with its rotation is reduced.

These objects can be attained by a magnetic recording medium comprising a non-magnetic support and a magnetic layer provided thereon containing a ferromagnetic substance, the magnetic layer having a multilayer structure consisting of a lower layer containing a ferromagnetic substance in an ellipsoidal shape with a long axis to short axis ratio of 1.5 or more and a saturation magnetization of 60 emu/g or more and an upper layer containing a ferromagnetic substance of plate-shaped hexagonal crystal system having the axis of easy magnetization in the vertical direction to the plate surface.

BRIEF DESCRIPTION OF THE DRAWING

The accompanying drawing is to illustrate the principle and merits of the present invention in detail.

DETAILED DESCRIPTION OF THE INVENTION

Figure 1:
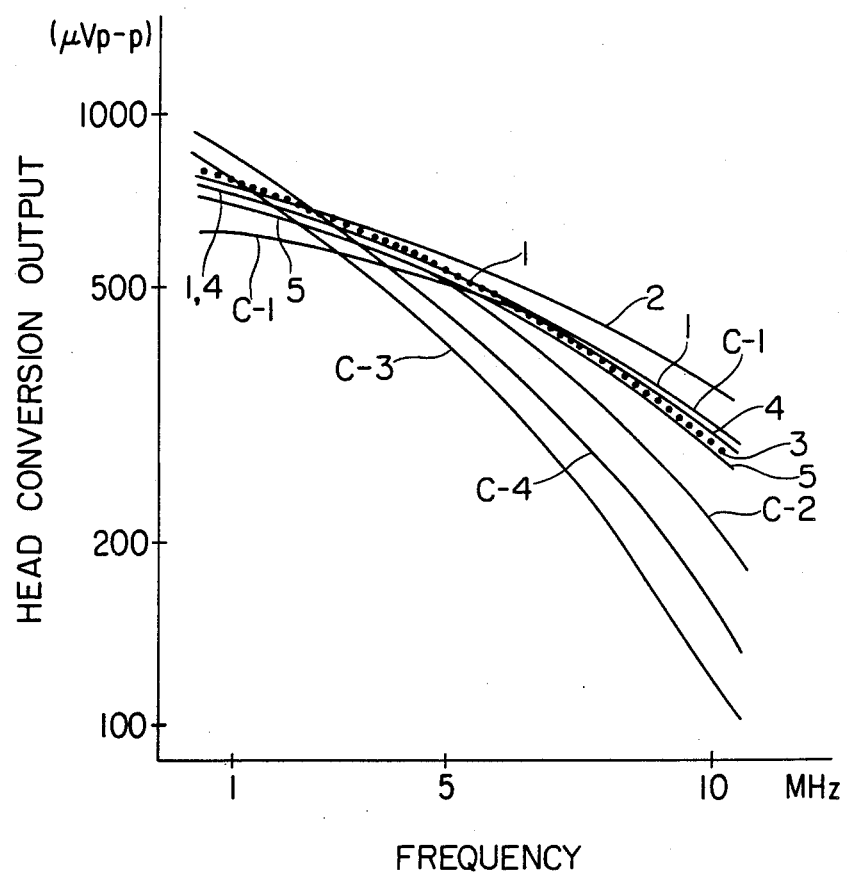
FIG. 1 is a graph showing the relationship between the head conversion output and recording signal frequency in a low output of the output fluctuation with a rotation period.

The inventors have made various efforts to solve the problems of the prior art and consequently, have found that the output at the low frequency side can be raised and the output fluctuation with a rotation period can be suppressed by the joint use of a plate-shaped ferromagnetic substance and an ellipsoidal ferromagnetic substance with $$1.5 \leq \frac{\text{long axis}}{\text{short axis}} \leq 10$$

and a saturation magnetization of at least 60 emu/g in such a laminar structure that a layer containing the latter ferromagnetic substance is provided at the support side and another layer containing the former ferromagnetic substance is provided thereon. The present invention is based on this finding.

Accordingly, there is provided a magnetic recording medium comprising a non-magnetic support and a magnetic layer provided thereon containing a ferromagnetic substance, the magnetic layer having a multilayer structure consisting of a lower layer containing a ferromagnetic substance in an ellipsoidal shape with $$1.5 \leq \frac{\text{long axis}}{\text{short axis}} \leq 103$$

$$1.5 \leq \frac{\text{long axis}}{\text{short axis}} \leq 10$$

and a saturation magnetization of at least 60 emu/g and an upper layer containing a ferromagnetic substance of plate-shaped hexagonal system having the axis of easy magnetization in the vertical direction to the plate surface. Preferably, the upper layer has a thickness of 0.1 to 10 μm, particularly, 0.1 to 5 μm and the lower layer has a thickness of 0.1 to 20 μm, particularly, 0.1 to 10 μm.

Examples of the ferromagnetic substance of plate-shaped hexagonal system having the axis of easy magnetization in the vertical direction to the plate surface, used in the upper layer according to the present invention, are hexagonal ferrite powders such as powders of barium ferrite, strontium ferrite, lead ferrite and calcium ferrite, manganese bismuth and hexagonal cobalt alloys. Above all, Co-substituted products of barium ferrite and strontium ferrite are more preferable. The hexagonal and plate-shaped feromagnetic substance of the present invention has preferably a plate diameter (Mean grain diameter) of 0.01 to 10 μm, more preferably 0.03 to 0.10 μm and a plate thickness (mean thickness) of 0.003 to 5 μm, more preferably 0.015 to 0.05 μm, and can be prepared by any of known methods. The plate-shaped ratio (plate diameter/plate thickness) is preferably 2 or more, more preferably 3 to 10.

The ferromagnetic substance of plate-shaped hexagonal system has a coercive force Hc of 400 to 2,000 Oe, preferably 500 to 1,500 Oe, and a saturation magnetization of at least 30 emu/g, preferably 50 to 65 emu/g. Preferably, the coercive force of this ferromagnetic substance is the same as or larger than that of the ferromagnetic substance in an ellipsoidal form.

Useful examples of the ellipsoidal ferromagnetic substance used in the lower layer according to the present invention are Co-added iron oxide type ellipsoidal ferromagnetic substances, for example, disclosed in Japanese Patent Applicaton No. 186923/1982. These ellipsoidal ferromagnetic substances of Co-added iron oxide type can be converted into alloy ferromagnetic substances with keeping the apparent shape, for example, by reducing in a hydrogen stream. The ellipsoidal ferromagnetic substances of Co-added iron oxide type and the reduced alloy ferromagnetic substances are used having a saturation magnetization of at least 60 emu/g, preferably 70 to 130 emu/g, since if the saturation magnetization is less than 60 emu/g, the reproducing output is not sufficient.

Furthermore, the ellipsoidal ferromagnetic substance has preferably a coercive force of 400 to 1000 Oe, more preferably 500 to 900 Oe, and a grain size (long axis) of 0.01 to 10 μm, more preferably 0.05 to 0.5 μm.

The ellipsoidal shape used in this specification means an ellipsoid-like shape a needle-like shape.

In addition to the above described ferromagnetic substance, optionally, binders and additives such as dispersing agents, lubricants, abrasives, antistatic agents, etc. can be added to the upper and lower magnetic layers of the present invention.

Suitable binders which can be used in the present invention include hitherto known thermoplasftic resins, thermosetting resins and mixtures thereof.

Suitable thermoplastic resins are those which have a softening point of about 150° C. or lower, a mean molecular weight of about 10,000 to 200,000 and a degree of polymerization of about 200 to 2,000, for example, vinyl chloride-vinyl acetate copolymers, vinyl chloride-vinyl acetate-maleic acid copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, mathacrylatevinylidene chloride copolymers, methacrylate-styrene copolymers, urethane elastomers, polyvinyl fluoride, vinylidene chloride-acrylonitrile copolymers, butadieneacrylonitrile copolymers, polyamide resins, polyvinyl butyral, cellulose derivatives such as cellulose acetate butyrate, cellulose diacetate, cellulose triacetate, cellulose propionate, nitrocellulose and the like, styrenebutadiene copolymers, polyester resins, various synthetic rubber based thermoplastic resins such as polybutadiene, polychloroprene, polyisoprene and styrene-butadiene copolymers, and mixtures thereof.

Suitable thermosetting resins have a molecular weight of about 200,000 or less as a coating solution and when coated and dried, the molecular weight becomes infinity due to reactions such as condensation, addition and the like. Of these resins, preferred resins are those which do not soften or melt before the resin thermally decomposes. Representative examples of these resins are phenol-formalin novolak resins, phenol-formalin resol resins, phenol-furfural resins, xylene-formaldehyde resins, urea resins, melamine resins, drying oil-modified alkyd resins, carbolic acid-modified alkyd resins, maleic acid-modified alkyd resins, unsaturated polyester resins, epoxy resins and hardeners such as polyamines, acid anhydrides, polyamide resins and the like, terminal isocyanate polyester resins of moisture hardening type, terminal isocyanate polyether resins of moisture hardening type, polyisocyanate prepolymers such as compounds having three or more isocyanate groups in one molecule obtained by reaction of diisocyanates and low molecular weight triols, trimers and tetramers of diisocyanates, polyisocyanate prepolymers and resins having active hydrogens such as polyester polyols, polyether polyols, acrylic acid copolymers, maleic acid copolymers, 2-hydroxyethyl methacrylate copolymers, p-hydroxystyrene copolymers and the like, and mixtures thereof.

Of these binders, vinyl chloride-vinyl acetate-maleic anhydride copolymers are preferably used with best results in combination with the ferromagnetic substances of the present invention.

These binders can be used individually or in combination with each other and other additives can be added to the binders. The mixing ratio by weight of the ferromagnetic substance and binder is 8 to 400 parts by weight, preferably 10 to 200 parts by weight of the binder to 100 parts by weight of the ferromagnetic substance.

Suitable dispersing agents are fatty acids containing about 12 to 18 carbon atoms represented by the general formula $R_1COOH$ wherein $R_1$ is an alkyl or alkenyl group containing about 11 to 17 carbon atoms, for example, caprylic acid, capric acid, lauric acid, myristic acid, palmitic acid, stearic acid, oleic acid, elaidic acid, linolic acid, linolenic acid, stearolic acid and the like; metallic soaps comprising the alkali metal salts (Li, Na, K, etc.) salts or alkaline earth metal (Mg, Ca, Ba, etc.) salts of the above described fatty acids;fluorine-containing compounds of the above described fatty acids ester; amides of the above described fatty acids; polyalkylene oxide alkylphosphoric acid esters; lecithin; trialkyl polyolefinoxy quaternary ammonium salts (alkyl: $C_1$–$C_5$; olefin: ethylene, propylene, etc.) and the like. In addition, higher alcohols containing 12 or more carbon atoms and sulfuric acid esters thereof can be used.

These dispersing agents are generally used in a proportion of 0.5 to 20 parts by weight to 100 parts by weight of the binder.

Suitable lubricants which can be used in the present invention include silicone oils such as dialkylpolysiloxanes (alkyl: $C_1$–$C_5$), dialkoxypolysiloxanes (alkoxy: $C_1$–$C_4$), monoalkylmonoalkoxypolysiloxanes (alkyl: $C_1$–$C_5$; alkoxy: $C_1$–$C_4$), phenylpolysiloxanes and fluoroalkylpolysiloxanes (alkyl: $C_1$–$C_5$); electroconductive fine powders such as graphite powder; inorganic fine powders such as molybdenum disulfide and tungsten disulfide powders; plastic fine powders such as polyethylene, polypropylene, ethylene-vinyl chloride copolymers and polytetrafluoroethylene powders; $\alpha$-olefin polymers; unsaturated aliphatic hydrocarbons liquid at normal temperature (wherein double bond of n-olefin is bonded to terminal carbon, number of carbon atoms: about 20); fatty acid esters of monobasic fatty acids of $C_{12}$–$C_{20}$ and monohydric alcohols of $C_3$–$C_{12}$; and fluorocarbons. These lubricants are generally used in a proportion of 0.2 to 20 parts by weight to 100 parts by weight of the binder.

Typical abrasive agents which can be used in the present invention include fused alumina, silicon carbide, chromium oxide($Cr_2O_3$), corundum, diamond, synthetic corundum, synthetic diamond, garnet, emery (main component: corundum and magnetite) and the like. These abrasive agents have generally a Mohs' hardness of 5 or more and a mean grain size of 0.05 to 5 $\mu$m, more preferably 0.1 to 2 $\mu$m, and are generally used in a proportion of 0.5 to 20 parts by weight is 100 parts by weight of the binder.

Antistatic agents which can be used in the present invention include electroconductive fine powders such as carbon black and carbon black graft polymers; natural surface active agents such as saponin; nonionic surface active agents such as alkylene oxide based, glycerol based and glycidol based surface active agents; cationic surface active agents such as higher alkylamines, quaternary ammonium salts, heterocyclic compounds such as pyridine and the like, phosphonium or sulfonium salts and the like; anionic surface active agents containing acid groups such as carboxylic acid, sulfonic acid, phosphoric acid, sulfate, phosphate groups and the like; and amphoteric surface active agents such as amino acids, aminosulfonic acids and sulfuric acid or phosphoric acid esters of amino alcohols and the like.

The above described electroconductive fine powders are generally added in a proportion of 0.2 to 20 parts by weight to 100 parts by weight of the binder and the surface active agents are generally added in a proportion of 0.1 to 10 parts by weight to 100 parts by weight of the binder.

These surface active agents can be used individually or in combination with each other. These surface active agents are generally used as antistatic agents, but in some cases, they are used for other purposes, for example, for improving dispersibility, magnetic properties and lubricity, or as an auxiliary coating agent.

The resin component of the binder in the magnetic layer of the present invention is used in a proportion of about 10 to 100 parts by weight, preferably 13 to 50 parts by weight to 100 parts by weight of the ferromagnetic substance.

Formation of the magnetic layer used in the present invention is carried out by dispersing a ferromagnetic substance in a binder, additive and solvent to prepare a coating composition, coating the resulting coating composition onto a support, subjecting to orientation and then drying. The ferromagnetic substance, binder, dispersing agent, lubricant, abrasive, antistatic agent and solvent were blended and kneaded to prepare a magnetic coating composition. For kneading, the magnetic powder and other components as set forth above are charged in a kneading machine simultaneously or separately. For example, a magnetic powder is added to a solvent containing a dispersing agent and kneaded for a predetermined period of time to prepare a magnetic coating composition.

Various kneading machines are used for the kneading and dispersing of the magnetic coating composition, for example, two roll mills, three roll mills, ball mills, pebble mills, trommel mills, sand grinders, Szegvari attriters, high speed impeller dispersing machines, high speed stone mills, high speed mixers, homogenizers, ultrasonic dispersing machines and the like. The kneading and dispersing techniques are described in T. C. Patton, "Paint Flow and Pigment Dispersion", published by John Wiley & Sons (1964) and U.S. Pat. Nos. 2,581,414 and 2,855,156.

The foregoing magnetic recording layer can be coated on a support using coating methods such as air doctor coating, blade coating, rod coating, extrusion coating, air knife coating, squeeze coating, dip coating, reverse roll coating, transfer roll coating, gravure coating, kiss coating, cast coating, spray coating, spin coating and the like, and other coating methods can also be used. These methods are described in "Coating Kogaku (Coating Engineering)", page 253–277, published by Asakura Shoten, Tokyo (Mar. 20, 1971).

The magnetic layer coated onto a support by the above described coating method is dried after, if necessary, the coating has been subjected to a treatment for orientating the magnetic substance in the layer. If necessary, the magnetic layer can be subjected to a surface-smoothening treatment or cut in a desired shape, thereby to form the magnetic recording medium of the present invention.

According to the present invention, in particular, it is found that when the magnetic layer is subjected to a surface-smoothening treatment, a magnetic recording medium can be obtained with a smooth surface as well as an excellent abrasion resistance. This surface smoothening treatment is carried out by a smoothening treatment before drying or by a calendering treatment after drying.

As the support, there are used for example, polyesters such as polyethylene terephthalate and polyethylene-2,6-naphthalate, polycarbonates, polyamides, polyimides, polyamideimides, polyolefins such as polypropylene, cellulose derivatives such as cellulose triacete and cellulose diacetate and the like.

When the above described non-magnetic support is in the form of a film, tape, sheet or card, it can be subjected to the so-called back coating at the opposite surface to a magnetic layer provided thereon for the purpose of preventing static charging, magnetic print through and wow and flutter, increasing the strength of the magnetic recording medium and matting the back surface.

This back layer is provided by mixing, kneading and dispersing at least one additive of lubricants, abrasives and antistatic agents described above and optionally a dispersing agent with a binder and coating solvent described above, and coating the resulting coating composition onto the back surface of support as described above followed by drying. Either of the above described magnetic layer and back layer can first be provided on a support.

The commonly used preferable additives are carbon black, graphite, talc, $Cr_2O_3$, $TiO_2$, $CaCO_3$, $\alpha\text{-}Fe_2O_3$ and silicone oils, which can be used individually or in combination. As the binder, the foregoing thermosetting resins are preferable.

The additives are added in a proportion of about 20 to 85% by weight, preferably 30 to 80% by weight to the whole solid content of the back layer in the case of inorganic compounds and in a proportion of about 0.1 to 30% by weight, preferably 0.2 to 20% by weight in the case of organic compounds. The thickness of the back layer, on dry basis, can suitably be chosen in the range of at most about 5 μm depending upon the total thickness, use, shape and object of the magnetic recording medium.

According to the present invention, there is provided a magnetic recording medium whose output is increased over a wide range of from long wavelengths to short wavelengths and whose ouput fluctuation with rotation period is decreased when rotating and reproducing in the form of a disk.

The following examples are given in order to illustrate the present invention in detail without limiting the same, in which all parts are to be taken as those by weight unless otherwise indicated.

EXAMPLES

| Composition A | |
|---|---|
| Co-substituted Ba Ferrite (plate-shaped grain with mean grain diameter of 0.1 μm, plate-shaped ratio of 3.3 and mean thickness of 0.03 μm; coercive force 660 Oe and saturation magnetization 58 emu/g) | 300 parts |
| Graphite Powder | 15 parts |
| Vinyl Chloride-Vinyl Acetate-Maleic Anhydride Copolymer (degree of Polymerization 450) | 45 parts |
| Amyl Stearate | 10 parts |
| Lecithin | 3 parts |
| Chromium Oxide ($Cr_2O_3$) | 5 parts |
| Methyl Ethyl Ketone | 300 parts |
| Toluene | 300 parts |

The above described components were mixed and dispersed with circulation in a sand grinder to prepare Composition A.

| Composition B | |
|---|---|
| Co-added Iron Oxide Magnetic Substance (ellipsoidal shape, acicular ratio $\left(\frac{\text{long axis}}{\text{short axis}}\right) \approx 3$, mean length of long axis 0.1 μm; coercive force 660 Oe and saturation magnetization 75 emu/g) | 300 parts |
| Graphite Powder | 15 parts |
| Vinyl Chloride-Vinyl Acetate-Maleic Anhydride Copolymer (degree of Polymerization 450) | 45 parts |
| Amyl Stearate | 10 parts |
| Lecitin | 3 parts |
| Chromium Oxide ($Cr_2O_3$) | 5 parts |
| Methyl Ethyl Ketone | 300 parts |
| Toluene | 300 parts |

The above described components were mixed and dispersed with circulation in a sand grinder to prepare Composition B.

EXAMPLE 1

50 parts of a polyester polyol was added to Composition B, uniformly mixed, to which 30 parts of a polyisocyanate was then added, and the resulting mixture was mixed and dispersed again in the sand grinder to prepare a hardening magnetic coating composition. This coating composition was coated onto a polyethylene terephthalate film of 75 μm in thickness, subjected to a corona discharge treatment, to give a thickness of 2 μm on dry basis by means of a gravure roll and dried to form a first magnetic layer. 50 parts of a polyester polyol was added to Composition A, uniformly mixed, to which 30 parts of a polyisocyanate was then added, and the resulting mixture was mixed and dispersed again in the sand grinder to prepare a hardening magnetic coating composition. This coating composition was coated onto the above described first magnetic layer by means of the gravure roll to give a thickness of 2 μm on dry basis to form a second magnetic layer, followed by drying.

EXAMPLE 2

After the second magnetic layer was coated in Example 1, the resulting magnetic medium was dried while subjecting to orientation in a magnetic field with a strength of 3800 Oe in the vertical direction to the support surface.

COMPARATIVE EXAMPLES

| Composition C | |
|---|---|
| Co-added Iron Oxide Magnetic Substance (acicular ratio $\left(\frac{\text{long axis}}{\text{short axis}}\right) = 13$, mean length of long axis 0.3 μm, coercive force 660 Oe) | 300 parts |
| Graphite Powder | 15 parts |
| Vinyl Chloride-Vinyl Acetate-Maleic Anhydride Copolymer (degree of polymerization 450) | 45 parts |
| Amyl Stearate | 10 parts |
| Lecitin | 3 parts |
| Chromium Oxide ($Cr_2O_3$) | 5 parts |
| Methyl Ethyl Ketone | 300 parts |
| Toluene | 300 parts |

The above described components were mixed and dispersed with circulation in a sand grinder to prepare Composition C.

| Composition D | |
|---|---|
| Alloy Magnetic Substance (acicular ratio $\left(\frac{\text{long axis}}{\text{short axis}}\right) = 13$, mean length of long axis 0.3 μm, coercive force 1300 Oe) | 300 parts |
| Graphite Powder | 15 parts |
| Vinyl Chloride-Vinyl Acetate-Maleic Anhydride Copolymer (degree of Polymerization 450) | 45 parts |
| Amyl Stearate | 10 parts |
| Lecitin | 3 parts |
| Chromium Oxide ($Cr_2O_3$) | 5 parts |
| Methyl Ethyl Ketone | 300 parts |
| Toluene | 300 parts |

The above described components were mixed and dispersed with circulation in a sand grinder to prepare Composition D.

COMPARATIVE EXAMPLE 1

50 parts of a polyester polyol was added to Composition A, uniformly mixed, to which 30 parts of a polyisocyanate was added, and the resulting mixture was mixed and dispersed again in the sand grinder to prepare a hardening magnetic coating composition. This coating composition was coated onto a polyethylene terephthalate film of 75 μm in thickness, subjected to a corona discharge treatment, to give a coating thickness of 4 μm on dry basis by means of a gravure roll and then dried.

COMPARATIVE EXAMPLE 2

50 parts of a polyester polyol was added to Composition B, uniformly mixed, to which 30 parts of a polyisocyanate was then added, and the resulting mixture was mixed and dispersed in the sand grinder to prepare a hardening coating composition. This coating composition was coated onto a polyethylene terephthalate film of 75 μm in thickness, subjected to a corona discharge treatment, to give a coating thickness of 4 μm on dry basis by means of a gravure roll and then dried.

COMPARATIVE EXAMPLE 3

The whole amounts of Compositions A and C and 100 parts of a polyester polyol were uniformly mixed, to which 60 parts of a polyisocyanate was then added, and the resulting mixture was mixed and dispersed again in the sand grinder to prepare a hardening magnetic coating composition. This coating composition was coated onto a polyethylene terephthalate film of 75 μm in thickness, subjected to a corona discharge treatment, to give a coating thickness of 4 μm on dry basis by means of a gravure roll and then dried.

COMPARATIVE EXAMPLE 4

The whole amounts of Compositions A and D and 100 parts of a polyester polyol were uniformly mixed, to which 60 parts of a polyisocyanate was then added, and the resulting mixture was mixed and dispersed again in the sand grinder to prepare a hardening coating composition. This coating composition was coated onto a polyethylene terephthalate film of 75 μm in thickness, subjected to a corona discharge treatment, to give a coating thickness of 4 μm on dry basis by means of a gravure roll and then dried.

EXAMPLE 3

The procedure of Example 1 was repeated except using Ba ferrite in plate-shaped grains with a mean grain diameter of 0.15 μm, plate-shaped ratio of 3.3 and mean thickness of 0.045 μm and with a coercive force of 660 Oe instead of the Ba ferrite used for the preparation of Composition A.

EXAMPLE 4

The procedure of Example 1 was repeated except using a Co-added iron oxide magnetic substance with an acicular ratio (long axis/short axis) of about 5, mean length of long axis of 0.17 μm and coercive force of 660 Oe instead of the Co-added iron oxide magnetic substance used for the preparation of Composition B.

EXAMPLE 5

The procedure of Example 1 was repeated except using Co-substituted Sr ferrite in plate-shaped grains with a mean grain diameter of 0.07 μm, plate-shaped ratio of 3.3 and mean thickness of 0.021 μm and with a coercive force Hc of 950 Oe and saturation magnetization $\sigma s$ of 60 emu/g instead of the Co-substituted Ba ferrite used for the preparation of Composition A.

The coated films in Examples 1–5 and Comparative Examples 1–4 were dried, subjected to a calendering treatment and punched in a disk of 50 mm in diameter to thus form disk-shaped magnetic recording media.

These samples were subjected to measurement of the recording and reproducing outputs at a track diameter of 40 mm using a ferrite head with 3600 rpm. In all the samples, the output fluctuation with the rotation period occurred every 180 degrees to give the following results shown in Table 1, when the degree of the output fluctuation was represented by $$\frac{A - B}{A} \times 100 \, (\%)$$

wherein A was a higher output and B was a lower output:

TABLE 1

| Example | Output Fluctuation %) | Comparative Example | Output Fluctuation (%) |
|---|---|---|---|
| 1 | 1.5 | 1 | 4.4 |
| 2 | 3.0 | 2 | 4.5 |
| 3 | 2.7 | 3 | 15.0 |
| 4 | 3.5 | 4 | 18.0 |
| 5 | 2.5 | | |

In addition, the relationship between the output B, as a head conversion output, and recording signal frequency is shown in FIG. 1 in which Curves 1, 2, 3, and 5 correspond to Examples 1–4 and Curves C-1–C-4 correspond to Comparative Examples 1–4.

It will be apparent from the results of Table 1 and FIG. 1 that Examples 1 to 4 give less output fluctuations and higher output in wider frequency zones.

What is claimed is:

1. A magnetic recording medium comprising a non-magnetic support and a magnetic layer provided thereon containing a ferromagnetic substance, a magnetic layer having a multilayer structure consisting of the lower layer containing a Co-added iron oxide-containing ferromagnetic substance in an ellipsoidal shape with 1.5 ≦ long axis/short axis ≦ 3 and a saturation magnetization of at least 60 emu/g and an upper layer containing a ferromagnetic substance of plate-shaped hexagonal system with a plate diameter of 0.01 to 10 μm and a plate thickness of 0.003 to 5 μm, a coercive force of 400 to 2000 Oe, and a saturation magnetization of at least 30 emu/g, the coercive force of the ellipsoidal ferromagnetic substance being no greater than that of the plate-shaped ferromagnetic substance, the upper layer having an axis of easy magnetization in the perpendicular direction to the plate surface; the magnetic recording medium being in the form of a disk.

2. The magnetic recording medium of claim 1, wherein the magnetic layer of the upper layer is orientated in the vertical direction to the non-magnetic support surface.

3. The magnetic recording medium of claim 1, wherein the ferromagnetic substance in the upper layer is selected from the group consisting of barium ferrite, strontium ferrite, lead ferrite, calcium ferrite, manganese-bismuth alloys and hexagonal cobalt alloys.

4. The magnetic recording medium of claim 3, wherein the ferromagnetic substance in the upper layer is selected from the group consisting of Co-substituted barium ferrites and Co-substituted strontium ferrites.

5. The magnetic recording medium of claim 1, wherein the ferromagnetic substance in the upper layer has a plate diameter to a plate thickness ratio of at least 2.

6. The magnetic recording medium of claim 1, wherein the ferromagnetic substance in the lower layer is selected from the group consisting of Co-added iron oxides and reduced alloys thereof.

7. The magnetic recording medium of claim 1, wherein the saturation magnetization of the ferromagnetic substance used in the lower layer, is in the range of 70 to 130 emu/g.

8. The magnetic recording medium of claim 1, wherein the ferromagnetic substance in an ellipsoidal shape has a grain size (long axis) of 0.01 to 10 $\mu$m.

9. The magnetic recording medium of claim 1, wherein the upper layer has a thickness of 0.1 to 10 $\mu$m and the lower layer has a thickness of 0.1 to 20 $\mu$m.

10. The magnetic recording medium of claim 1, wherein the ferromagnetic substance in an ellipsoidal shape has a coercive force of 400 to 1000 Oe.

11. The magnetic recording medium of claim 1, wherein the ferromagnetic substance of plate-shaped hexagonal system has a plate diameter of 0.03 to 0.10 $\mu$m.

* * * * *